United States Patent [19]

Jukkola

[11] 4,263,262

[45] Apr. 21, 1981

[54] FLUID BED CALCINING PROCESS

[75] Inventor: Walfred W. Jukkola, Westport, Conn.

[73] Assignee: Dorr-Oliver Incorporated, Stamford, Conn.

[21] Appl. No.: 80,829

[22] Filed: Oct. 1, 1979

[51] Int. Cl.³ .................. C01F 11/00; F27B 15/00
[52] U.S. Cl. .................. 423/167; 422/142; 423/DIG. 16; 432/15; 432/58; 432/72
[58] Field of Search .................. 423/167, DIG. 16; 432/58, 72, 15; 422/142

[56] References Cited

U.S. PATENT DOCUMENTS

| | | | |
|---|---|---|---|
| 3,266,788 | 8/1966 | Jukkola | 432/15 |
| 3,364,008 | 1/1968 | Hollingsworth et al. | 423/167 |
| 3,758,266 | 9/1973 | Retali et al. | 423/167 |
| 3,872,211 | 3/1975 | Wall | 423/167 |
| 3,998,929 | 12/1976 | Leyshon | 423/DIG. 16 |
| 4,017,585 | 4/1977 | Angeuine et al. | 432/15 |
| 4,083,929 | 4/1978 | Priestley | 423/DIG. 16 |
| 4,085,516 | 4/1978 | Jukkola et al. | 432/15 |

Primary Examiner—O. R. Vertiz
Assistant Examiner—Wayne A. Langel
Attorney, Agent, or Firm—Harold M. Snyder; Burtsell J. Kearns

[57] ABSTRACT

In order to increase or maintain the capacity of fluid bed calciners in the calcination of phosphate rock containing large amounts of organic matter ("hot rocks"), the calciner is modified to permit a pyrolysis reaction to occur in the freeboard zone of the calciner. The hydrocarbons and carbon monoxide gas produced by the pyrolysis reaction are removed from the calciner and burned in an afterburner unit. Dust and fines entrained in the exhaust from the calciner are sent to a dust oxidation chamber outside the calciner for oxidation by addition of air.

8 Claims, 1 Drawing Figure

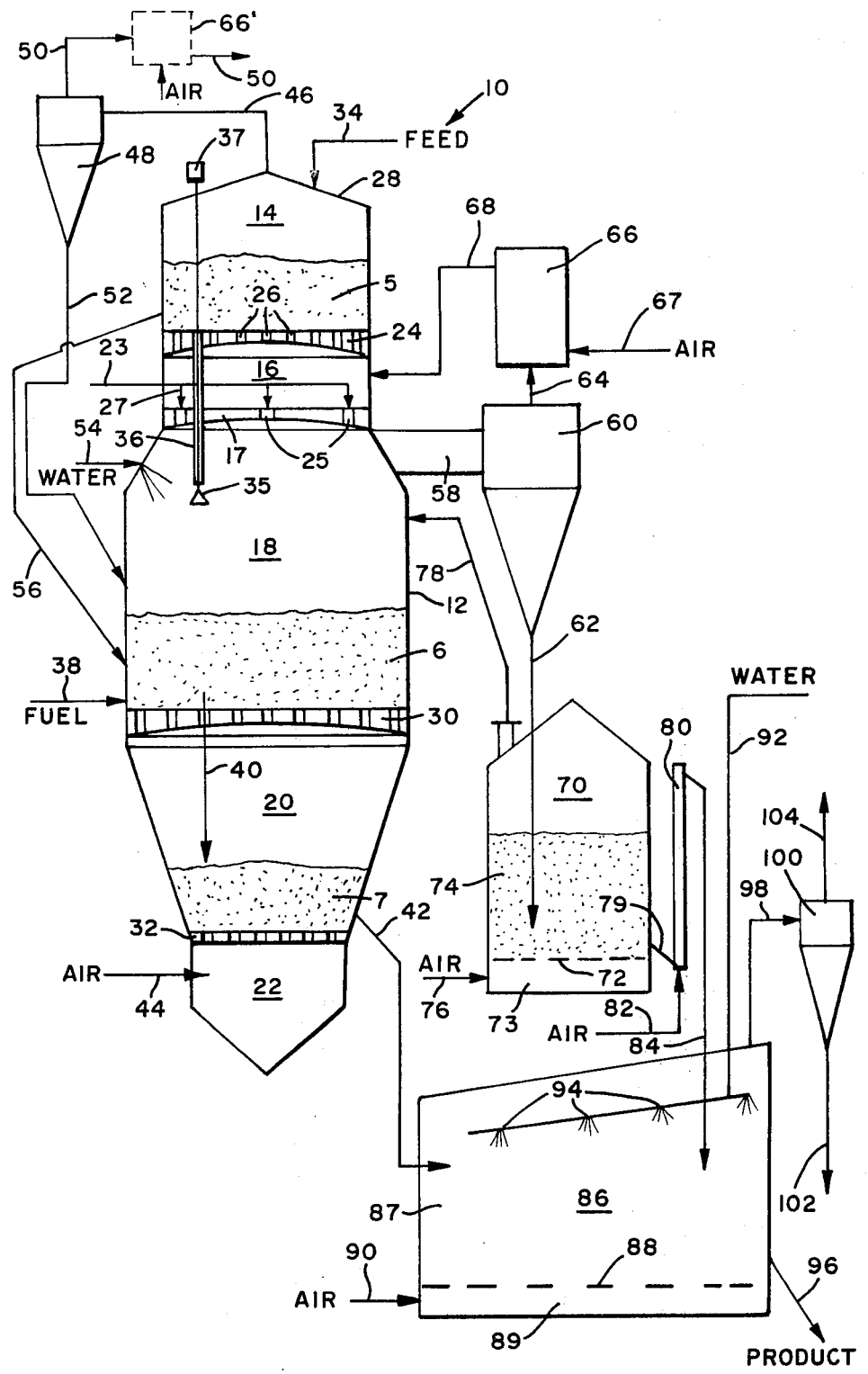

FLUID BED CALCINING PROCESS

This invention is directed to a novel fluid bed calcining process and to apparatus specially modified and improved to beneficiate phosphate rock containing large amounts of organic contaminates; i.e., the phosphate rock known as "hot rocks".

Phosphate rock is found in many places in the world in deposits of varying composition. In order to prepare the phosphate rock for making phosphoric acid, which is then utilized in subsequent reactions; i.e., the manufacture of triple superphosphate and for other valuable products, it is sometimes necessary to beneficiate the phosphate rock by removing certain of the impurities. Very often a substantial amount of limestone ($CaCO_2$) is associated with the phosphate rock and a calcining operation is indicated to drive off the $CO_2$, leaving time (CaO) which may then be removed by slaking and separating. In this way, beneficiation of the phosphate rock is effected. Organic matter is usually present as an impurity in the phosphate rock ore and this oxidizes in the course of the calcining operation effecting a further beneficiation and, incidentially, reducing the amount of fuel required for the calcining. Sulfur, in the form of pyrite or pyrrhotite, may also be present in amounts from $\frac{1}{2}$ to 2%, by weight, and is oxidized in the calciner. The amount of organic matter varies with the source of the phosphate rock but, in the past, the combustion of the organics and oxidation of the sulfur compounds normally provided $\frac{1}{3}$ to $\frac{2}{3}$ of the total fuel requirements for the heat treatment of the ores to make the ores amenable for use in fertilizer manufacture.

The phosphate ores now being mined in the Western United States are situated in much greater depths than formerly. The organic content of the ores apparently increases with depth of the mine. Currently, much of the mined ore contains excessive fuel value (organic content) for autogenous calcination operation. As a result, the operating capacity of the calciners is reduced and cooling water must be added instead of fuel, to control the temperature of the calcination operation.

In times past, the organic content of wester phosphate ores was less than 1%, generally hovering about 0.5%, by weight, but in recent years, organic carbon content of the ores has climbed so that it is often in the range from 2% to 4% and occasionally even rises to 10%, by weight.

More than two decades ago a very efficient three-compartment fluidized bed reactor was developed for the heat treatment of the western phosphate rocks. In the process in which this reactor is employed, finely divided phosphate rock is dried and preheated in a first fluidized bed, then transported to a second fluidized bed where calcination takes place at a higher temperature and, finally, the calcined product is removed to a fluidized cooling bed which serves to reduce the temperature of the calcined product and, at the same time, to heat incoming air. Commonly, the three fluidized beds are provided in a single reactor vessel with the drying compartment at the top of the vessel, the calcination compartment immediately therebelow with means for passing dried material from the drying compartment into the calcination compartment, and the cooling compartment immediately below the calcination compartment. The drying compartment and the cooling compartment each have their own windbox with the freeboard of the cooling compartment serving as the windbox for the calcination compartment. The gas flow in the reactor is in a direction opposite to that of the solids undergoing treatment.

In general, this system for treating phosphate rock is remarkably effective and efficient and has found wide acceptance. However, the increased organic carbons present in the ores now being mined has had the effect of reducing the capacity of existing units.

Accordingly, there is very real need for a process and system, applicable in modification of existing fluid bed calcination installations and in erection of new installations, which would permit calcination of phosphate rock ores having a high organic carbon content at high rates of production.

It is the object of this invention to provide a system for fluidized bed calcination of phosphate rock having a high organic content wherein a substantial part of the oxidation reaction is conducted outside the fluid bed reactor proper.

It is a further object of this invention to promote a partial pyrolysis reaction is the calcining compartment of the fluid bed reactor so that carbon-containing substances may be exhausted from the calcining compartment for combustion outside the fluid bed reactor.

Other objects and advantages of the invention will become apparent from the following description taken in conjunction with the accompanying drawing in which:

The FIGURE is a diagrammatic representation of a multi-chamber fluidized bed reactor system with associated combustion and other apparatus.

Generally speaking, the invention is directed to a process and apparatus for calcining phosphate rock containing large amounts of organic carbon ("hot rocks") wherein a conventional three-stage calcination process is carried out in a fluid bed reactor, and simultaneously, pyrolysis of a portion of the feed to the calcining compartment is effected in the freeboard of the calcining compartment, the carbon-containing gaeous products of pyrolysis are removed from the calcining compartment with the off-gases of the calcining reactor and oxidized in an afterburner, the fine dust and solids entrained in the off-gases are separated therefrom and removed to a fluid bed dust oxidation chamber wherein calcination and oxidation of the dust and fine particles are carried out.

The operating temperature in the calcining compartment will be in the range from about 700° C. up to about 900° C. and, preferably, in the range from about 700° C. up to about 760° C. The temperature at the lower end of the range are preferred for the reason that they are sufficiently high to carry out the pyrolysis and desired calcination reaction, and yet, well within tolerable operating limits of the refractory brick and other structural elements of the calcining compartment.

Fluidized bed reactors of the type under consideration are basically vertical furnaces which are divided by a transverse, horizontally extending, gas permeable constriction plate into a windbox compartment below the plate and a heat treatment compartment above the plate. A bed of feed material to be treated is supported on the plate and is maintained in fluidized state by air, or other oxygen-containing gas, which is introduced through the constriction plate into the bed. The pressure of the fluidizing gas causes the solids to take on the appearance and many of the properties of a boiling liquid, i.e., a fluid level is present, there is almost instantaneous heat transfer and equalization of temperature throughout the bed, and the particles are constantly changing position relative to each other. The constant flux and movement of the bed particles brings the particles into contact with each other and exposes the surface of the particles to the fluidizing gases so that an accelerated and complete reaction occurs in the bed.

In the ordinary course of events, in practicing the present invention, the reactions conducted in the calcination compartment are autogenous. Only during start-up and when the ore feed, which is variable, drops in organic carbon content, will it be necessary to add an auxiliary fuel to the bed to maintain the reaction chamber at the desired temperature level. Generally, solids to be treated are fed into the upper portion of the fluidized bed and the calcined products are removed from the bottom portion of the bed. The products of combustion are discharged from the heat treatment or calcining compartment and from there can be used to preheat incoming solids.

Referring now to the calcining system shown in the FIGURE, the fluid bed reactor 10 comprises the shell 12, a preheat compartment 14, a hot windbox 16, a calcining compartment 18, a cooling zone or compartment 20, and a cold windbox 22. The preheat compartment 14 and the hot windbox 16 are separated from each other by a transverse constriction dome 24, having a plurality of orifices or tuyeres 26. A partition 17 isolates the calcining compartment 18 from the hot windbox 16. A constriction dome 30 separates the calcining compartment 18 from the cooling compartment 20 and a constriction plate 32 separates the cooling compartment 20 from the cold windbox 22.

The calcining system includes auxiliary equipment required to complete calcination of the feed which is only partially carried out in the succession of fluid bed compartments provided in fluid bed reactor 10. This auxiliary equipment treats the gaseous and entrained solid constituents of the off-gases of calcining chamber 18. Hot cyclone 60 is connected with the freeboard of calcining chamber 18 by hot cyclone inlet 58. A solids discharge line 62 and a gas discharge conduit 64 are connected to hot cyclone 60 to handle the separation products. Gas discharge conduit 64 provides a gas passage to afterburner 66 from the hot cyclone 60. Solids discharge line 62 connects hot cyclone 60 to dust oxidation chamber 70. Afterburner 66 is provided with conduit 67 through which air can be admitted and with an off-gas conduit 68 connecting afterburner 66 with windbox 16. The dust oxidation chamber 70 is a fluidized bed reactor having a constriction plate 72 and a windbox 73. Conduit 76 is connected to the dust oxidation chamber 70 for admitting air into the windbox 73. An off-gas conduit connects dust oxidation chamber 70 with the calcining chamber 18 of fluid bed reactor 10. Solids withdrawal line 79 is connected to dust oxidation chamber 70 for removal of product to a cooling zone.

The material to be treated, having been reduced to a predetermined particle size, is fed into the top of preheat compartment 14 by means well known in the art, such as conduit 34. After absorbing a desired amount of heat in a manner to be presently described, the solids are transferred by gravity through transfer conduit 36 into calcining compartment 18. The transfer conduit 34 is provided with a cone valve 35 at the lower end thereof which is controlled by manual or automatic operating means 37. The cone valve 35 spreads the ore in a cone-like pattern in falling, facilitating the reaction. The lower end of transfer conduit 36 is below the level of the cyclone gas conduit 58 to minimize entrainment of solids which fall free of the conduit 36 in the freeboard, but is well above the upper surface of the fluidized bed in calcination chamber 18. In general, the lower end of conduit 36 is from 1 to 3 meters, or even 5 meters, above the surface of the fluidized bed in compartment 18. In falling through the freeboard the solid matter is subjected to elevated temperatures in the range from about 700° C. to about 900° C. such that a portion of the solids undergo a pyrolysis reaction. The pyrolysis reaction produces hydrocarbons and carbon monoxide gases or vapors which exit with the combustion gases through the exhaust gas outlet 58. That part of the solid material which falls through the freeboard of calcination chamber 18 without undergoing pyrolysis is calcined and oxidized in the normal way in the fluidized bed within the calcination chamber 18.

In using a "hot rock" feed, the temperature in calcining compartment 18 tends to exceed the desired temperature range. Temperature control is achieved in calcining compartment 18 by injecting water into the freeboard of compartment 18, as required. Thus, water may be fed through line 54 and sprayed into the freeboard of compartment 18. However, should the temperature temporarily fall below the desired range, uncalcined phosphate rock may be transferred directly from fluidized bed 5 in preheat compartment 14 to fluidized bed 6 in calcining compartment 18 through by-pass conduit 56. The combustion of organics in the by-passed feed will raise the temperature in compartment 18.

The calcined material in the fluidized bed of calcination chamber 18 is removed to the cooling chamber 20 through the solids transfer means 40. In cooling chamber 20, the calcined product is fluidized by air introduced into the windbox 22 through air conduit 44. In traversing the fluidized bed of hot, calcined solids and cooling chamber 20, the air reaches an elevated temperature (usually in the range from 475° C. to 540° C.) and is introduced into the calcination chamber 18 as the fluidizing media through the constriction dome 30. The partially cooled product in cooling chamber 20 is removed through product conduit 42 to a cooling zone or aftercooler 86.

The combustion gas and entrained solids in the freeboard or calcining compartment 18 are routed to the hot cyclone 60 through hot cyclone inlet conduit 58. The gases in the freeboard of the calcining compartment comprise carbon monoxide, hydrocarbons, carbon dioxide, water vapor and air. The reactions in the calcining compartment are conducted with a deficiency of oxygen, hence there is a reducing atmosphere in the freeboard of the calcining compartment. In the hot cyclone 60, the gas is separated from the entrained solids; the latter travelling through solids discharge line 62 into dust oxidation chamber 70. The dust entrained in the freeboard gases comprise unreacted phosphate rock feed, pyrolyzed phosphate rock and calcined phosphate rock. The pyrolyzed phosphate rock dust particles will contain pure carbon inclusions as the result of the pyrolysis reaction.

The gas from hot cyclone 60, largely free of entrained solids, is directed through gas discharge conduit 64 into the afterburner unit 66. This gas is at combustion temperature and the introduction of air into afterburner unit 66 through conduit 67 results in the desired combustion. The inert, hot, combustion gases from afterburner 66 are directed into windbox 16 to serve as fluidizing gas for the moist phosphate rock of fluidized bed 5 in drying and preheat compartment 14. In preheat compartment 14 the fluidized rock is dried and heated to a temperature suitable for the feed to the calcining compartment; for example, from 120° C. to about 400° C. The fluidizing gas together with the moisture and entrained solids picked up in transit through the fluidized bed 5 exits drying and preheat compartment 14 through conduit 46 which leads to cyclone 48. In cyclone 48 the gas and solids are separated, with the gas directed through exhaust conduit 50 for further treatment or discharge into the atmosphere, while the solids are directed into solids discharge conduit 52 for return to the calcining compartment 18.

While the afterburner 66 has been described and illustrated in a position intermediate the hot cyclone 60 and the windbox 16, it may, alternatively, be placed to receive the exhaust gas from exhaust conduit 50 (see the dotted line showing of afterburner 66'). So placed, the hot gases from the afterburner 66' may be used in a waste heat boiler to recover heat energy from the process.

In partition 17, which separates calcining compartment 18 from windbox 16, ports 25 are provided therethrough, with air jet nozzles 27 positioned to discharge downwardly through ports 25. Air is supplied to air jet nozzles 27 through air conduit 23 and the continuous jet discharge of air through ports 25 serves to remove any accumulation of solid particulates which find their way into the windbox 16 either from afterburner 66 or from bed 5. The jets of air also prevent flow of gas from calcining compartment 18 into windbox 16 through ports 25. This windbox clearing arrangement is more fully disclosed and covered in U.S. Pat. No. 3,511,616, issued to A. B. Steever on May 12, 1970.

The particulate solids which travel through solids discharge line 62 into dust oxidation chamber 70 form a bed 74 of solids resting on constriction plate 72. These particulate solids include substantial amounts of organic carbon material and uncalcined phosphate rock dust. Air is introduced through line 76 into windbox 73 from which it traverses constriction plate 72 to fluidize bed 74 and support oxidation within dust oxidation chamber 70. The temperature in dust oxidation chamber 70 is controlled by injecting either fuel or water into the chamber (by means not shown) to assure that the calcination and oxidation reaction is sustained without producing excessively high temperatures in chamber 70. The off-gas from dust oxidation chamber 70 is returned to the freeboard of calciner compartment 18 so that any dust re-entrained in the dust oxidation chamber 70 is recycled back to the hot cyclone 60.

The calcined product in dust oxidation chamber 70 is removed to after-cooler 86 through solids withdrawal line 79, air lift device 80 and discharge conduit 84. The air lift device is provided with air inlet 82 at the bottom thereof to provide an upwardly directed current of air to lift solids to a predetermined height for delivery to discharge conduit 84. Such an air lift device need be provided only where the dust oxidation chamber 70 and the after-cooler 86 are located on essentially the same level. Gravity feed from the dust oxidation chamber 70 to the after-cooler 86 is an obvious alternative when the units can be located at appropriate levels relative to each other.

As indicated previously, the after-cooler 86 receives the partially cooled product from cooling chamber 20 of fluid bed reactor 10 as well as the product of dust oxidation chamber 70. The after-cooler 86 is provided with a constriction plate 88 which divides the interior volume thereof into a windbox 89 and a fluidization chamber 87. Air at ambient temperature is directed into windbox 89 through air inlet conduit 90 and from the windbox 89 through constriction plate 88 to fluidize the body of solid particulates thereon. The fluidizing air exercises a cooling effect on the particulates and this effect is supplemented by water sprays 94 in fluidization chamber 87 which are fed by water conduit 92. The cooled product is discharged through product discharge conduit 96. The off-gas from chamber 86 is conducted to cyclone 100 through line 98. In the cyclone 100 the entrained solids are separated from the gas and discharged through conduit 102 to join with the flow from product discharge conduit 96. The gas from cyclone 100 is routed to line 104 for discharge to the atmosphere after passing through appropriate dust abatement systems.

There has thus been presented a system capable of maintaining or increasing the capacity of existing phosphate rock multi-bed calciners where the ore fed to the system contains large amounts of organic carbon therein.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A calcining process employing a succession of fluidized beds for beneficiation of phosphate rock of the "hot rock" variety containing excessive amounts of organic carbon comprising, fluidizing and heating the phosphate rock at an elevated temperature in a preheat compartment, transferring the preheated rock to a fluidized bed calcining compartment by discharging the rock into the freeboard of said calcining compartment well above the surface of the fluidized bed therein, whereby a first portion of said discharged rock falls into said calcining bed and a second portion of said discharged rock undergoes pyrolysis in the elevated temperature environment of said freeboard, removing the calcined product of said calcining bed to a cooling zone, removing the hydrocarbon gas and vapor and the carbon monoxide generated by the pyrolysis reaction in said freeboard together with entrained fines from said calcining compartment, separating the gas and vapor from the fines, passing the gas and vapor to an afterburner, introducing air into said afterburner for combustion reaction with said gas and vapor, routing the combustion gases from said afterburner to said preheating compartment as the fluidizing gas therefor, passing said fines to a fluidized bed in a dust oxidation chamber in which air is introduced as the fluidizing gas and supports oxidation of said fines.

2. The calcining process of claim 1 wherein said phosphate rock is discharged into said calcining compartment at a point from about 1 to about 3 meters above said fluidized bed therein.

3. The calcining process of claim 2 wherein the temperature in said calcining compartment is maintained in the range from about 700° C. up to about 900° C.

4. The calcining process of claim 3 wherein the off-gas from said dust oxidation chamber is returned to said freeboard of said calcining compartment to recycle entrained fines.

5. The calcining process of claim 4 wherein the temperature in said calcining compartment is maintained in the desired range by injection of water or adding phosphate rock from said preheat compartment to said fluidized bed in said calcining compartment, as required.

6. The calcining process of claim 3 wherein the temperature in said calcining compartment is prevented from exceeding the desired range by injection of water into said freeboard of said calcining compartment.

7. The calcining process of claim 3 wherein the temperature in said calcining compartment is prevented from falling below the desired range by passing phosphate rock from said preheat compartment directly into said fluidized bed in said calcining compartment.

8. A calcining process employing a succession of treatment zones including a preheat zone, a fluidized bed calciner and a cooling zone for benefication of phosphate rock of the "hot rock" variety containing excessive amounts of organic carbon comprising, heating the phosphate rock at an elevated temperature in a preheat zone, transferring the preheated rock to a fluidized bed calciner by discharging the rock into the freeboard of said calciner well above the surface of the fluidized bed therein, whereby a first portion of said discharged rock falls into said fluidized calcining bed and a second portion of said discharged rock undergoes pyrolysis in the elevated temperature environment of said freeboard, removing the calcined product of said calcining bed to a cooling zone, removing the hydrocarbon gas and vapor and the carbon monoxide generated by the pyrolysis reaction in said freeboard together with entrained fines from said calciner, separating the gas and vapor from the fines, passing the gas and vapor to an afterburner, introducing air into said afterburner for combustion reaction with said gas and vapor, routing the hot exhaust gases from said afterburner to said preheat zone, passing said fines to an oxidation chamber into which air is introduced and oxidizing said fines.

* * * * *

UNITED STATES PATENT AND TRADEMARK OFFICE
CERTIFICATE OF CORRECTION

PATENT NO. : 4,263,262
DATED : April 21, 1981
INVENTOR(S) : Walfred W. Jukkola

It is certified that error appears in the above-identified patent and that said Letters Patent are hereby corrected as shown below:

In column 1, line 16, change "$CaCO_2$" to --$CaCO_3$--. Line 18, change "time" to "lime". Line 43, change "wester" to --western--. Line 43, after "organic" insert --carbon--.

Signed and Sealed this

Nineteenth Day of October 1982

[SEAL]

Attest:

Attesting Officer

GERALD J. MOSSINGHOFF
Commissioner of Patents and Trademarks